July 10, 1956 L. W. ROMAINE 2,753,652
FISHING LINE SINKER
Filed Sept. 28, 1954
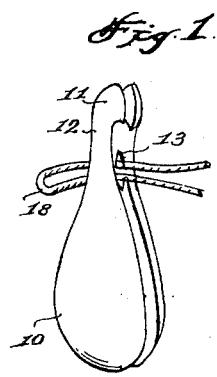
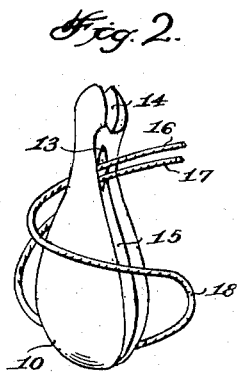
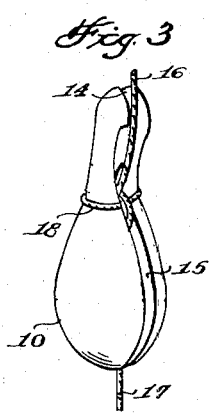
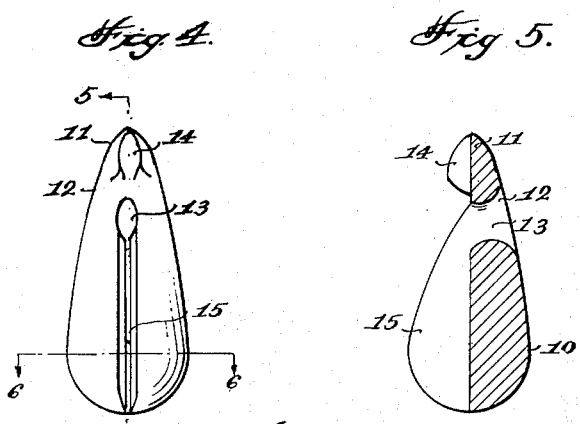
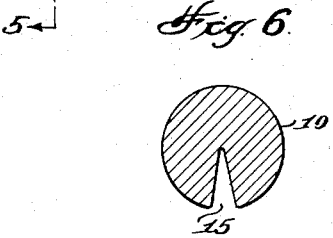
INVENTOR.
LLOYD W. ROMAINE
BY
ATTORNEYS

United States Patent Office 2,753,652
Patented July 10, 1956

2,753,652

FISHING LINE SINKER

Lloyd W. Romaine, Fond du Lac, Wis.

Application September 28, 1954, Serial No. 458,898

3 Claims. (Cl. 43—43.1)

This invention relates to fishing line sinkers of the type atached to the line with a loop and in which the sinker may readily be moved from one position to another on the line or removed from the line, and in particular, a sinker having a body with a head connected to the body by a neck and with an opening extended through the neck and also with aligned grooves in the head and body whereby with a fishing line having a loop extended through the opening and positioned around the neck one end is positioned in the groove extended through the head and the opposite end in the groove extended through the body.

The purpose of this invention is to provide a fishing line sinker that may readily be attached to or removed from a fishing line and that is adapted to follow the line through weeds and the like.

Various methods have been employed for attaching sinkers to fishing lines, however, with the most conventional sinker having an eye on the upper end the sinker is pulled by weeds and the like from the line and numerous sinkers are lost unless the line is threaded through the eye. With this thought in mind, this invention contemplates a sinker having an enlarged lower end with a small head connected to the upper end with a neck and in which a loop passed through an opening through the neck and looped around the body is adapted to be retained around the neck with the portion of the line extended to the rod positioned in a groove in the head and the portion extended to the hooks positioned in a groove in the body whereby the sinker is adapted to be locked in position on the line.

The object of this invention is, therefore, to provide an improved fishing line sinker that is adapted to be locked in different positions on a fishing line and that is also adapted to be readily removed from the fishing line.

Another object of the invention is to provide a fishing line sinker that is readily looped on and readily removed from a fishing line and that follows a line through weeds, snags, and the like.

A further object of the invention is to provide an improved fishing line sinker that is adapted to be readily secured in different positions on a fishing line in which the sinker is of a simple and economical construction.

With these and other objects and advantages in view, the invention embodies a fishing line sinker having a tear-shaped body with the upper part forming a head and with longitudinally aligned grooves extending through the head and body and in which an opening is provided in a portion, such as a neck, positioned between the head and body.

Other features and advantages of the invention will appear from the following description, taken in connection with the drawing, wherein:

Figure 1 is a perspective view of the improved fishing line sinker illustrating the method of inserting a loop of a fishing line through the opening in the neck of the sinker.

Figure 2 is a view similar to that shown in Figure 1 showing the loop drawn through the opening and positioned over the enlarged lower end or body of the sinker.

Figure 3 is a view also similar to that shown in Figures 1 and 2 showing the loop cinched up around the neck of the sinker, with one end of the fishing line extended through the groove in the head and the other through the portion of the groove through the body.

Figure 4 is a front elevational view illustrating the sinker and showing in particular a longitudinally disposed groove extended through the head and body and also the opening extended through the portion, such as a neck, between the head and body.

Figure 5 is a longitudinal section through the sinker taken on line 5—5 of Figure 4.

Figure 6 is a cross section through the sinker taken on line 6—6 of Figure 4.

Referring now to the drawing, wherein like reference characters denote corresponding parts, the improved fishing line sinker of this invention includes a body 10 having a head 11 extended from the upper part of the body and connected to the body with a section of reduced area forming a neck 12 and, as illustrated particularly in Figures 4 and 5, the neck is provided with an opening 13 and the head and body with aligned longitudinally disposed grooves 14 and 15, respectively.

With the tear- or pear-shaped body, the weight is provided at the lower end whereby with a section 16 of a fishing line extended upwardly through the groove 14 and a section 17 extended downwardly through the groove 15 the weight at the lower end retains the sinker in upright position and with the fishing line substantially enclosed in the grooves the sinker is adapted to pass through weeds and over snags following the fishing line back to the fishing rod.

In securing the sinker to a fishing line, the line is folded to form a loop, such as loop 18, and by drawing the loop through the opening 13 an enlarged loop is provided and the enlarged loop is extended over the lower portion or body 10, as illustrated in Figure 2. From the position shown in Figure 2, the loop is forced upwardly and by drawing on the sections 16 and 17 of the line the loop is drawn tight around the neck 12. With the loop in this position, the section 16 is placed in the groove 14 from which the section extends to a fishing rod or the like and the section 17 is carried downwardly through the groove 15 and hooks may be attached thereto by suitable means.

To move the sinker on a fishing line, it is only necessary to draw the sections downwardly or upwardly and to remove the sinker it is only necessary to slide the loop 18 over the lower portion of the body and withdraw the loop through the opening 13.

It will be understood that modifications, within the scope of the appended claims, may be made in the design and arrangement of the parts without departing from the spirit of the invention.

What is claimed is:

1. A fishing line sinker comprising a tear-shaped body having a head on the upper end with algined longitudinally disposed separate grooves in the head and body and with an opening extended from the groove in the body through the portion of the sinker bisecting the head and body at right angles to the groove.

2. A sinker comprising a body having an enlarged lower portion, a relatively small head, a neck portion disposed between and connected to said enlarged lower portion and said head, said neck having an opening therethrough and said head and lower portion of the body having aligned longitudinally disposed separate grooves extended inwardly from one side.

3. A sinker comprising a body having an enlarged lower portion, a relatively small head, a neck portion disposed between and connected to said enlarged lower portion and said head, said neck having an opening therethrough and said head and lower portion of the body having aligned longitudinally disposed separate grooves extended inwardly from one side, said opening in the neck bisecting the groove in the upper portion of the body from the groove in the lower portion of the body and positioned at right angles to said grooves.

References Cited in the file of this patent

UNITED STATES PATENTS

| | | |
|---|---|---|
| 883,048 | Pflueger | Mar. 24, 1908 |
| 1,618,100 | Lowry | Feb. 15, 1927 |
| 1,869,305 | Dockman | July 26, 1932 |
| 2,220,358 | Storey | Nov. 5, 1940 |
| 2,483,788 | Smith | Oct. 4, 1949 |
| 2,636,305 | Shoenfelt | Apr. 28, 1953 |